(12) United States Patent
Takahashi

(10) Patent No.: US 10,290,077 B2
(45) Date of Patent: May 14, 2019

(54) DISPLAY CONTROL APPARATUS AND METHOD FOR CONTROLLING THE SAME

(71) Applicant: CANON KABUSHIKI KAISHA, Tokyo (JP)

(72) Inventor: Tomoaki Takahashi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 15/458,720

(22) Filed: Mar. 14, 2017

(65) Prior Publication Data

US 2017/0278217 A1  Sep. 28, 2017

(30) Foreign Application Priority Data

Mar. 23, 2016 (JP) ................................. 2016-058811

(51) Int. Cl.
*H04N 5/222* (2006.01)
*G06T 3/40* (2006.01)
*G06F 3/0488* (2013.01)

(52) U.S. Cl.
CPC .............. *G06T 3/40* (2013.01); *G06F 3/0488* (2013.01); *G06F 2203/04803* (2013.01); *G06F 2203/04806* (2013.01)

(58) Field of Classification Search
CPC ........... H04N 5/23216; H04N 5/23293; H04N 1/00411; H04N 1/00442; H04N 1/00167; H04N 1/00196; H04N 1/3875; H04N 5/23296; H04N 1/393; H04N 3/1562; G06F 3/0412; G06F 1/1692; G06F 3/04886; G06F 3/048; G06F 3/04845; G06F 3/04842; G06F 3/0482; G06F 3/0484; G08B 13/19684; G09G 2340/045; G02B 15/14

See application file for complete search history.

(56) References Cited

U.S. PATENT DOCUMENTS

| | | | | |
|---|---|---|---|---|
| 9,645,699 | B2* | 5/2017 | Fleizach | G06F 3/0488 |
| 10,042,550 | B2* | 8/2018 | Hwang | G06F 3/0481 |
| 2011/0191712 | A1* | 8/2011 | Machida | G06F 3/0488 |
| | | | | 715/788 |
| 2012/0092253 | A1* | 4/2012 | Irani | G06F 1/1692 |
| | | | | 345/157 |
| 2013/0155308 | A1* | 6/2013 | Wu | G06T 3/00 |
| | | | | 348/333.05 |
| 2013/0237288 | A1* | 9/2013 | Lee | G06F 3/041 |
| | | | | 455/566 |

(Continued)

FOREIGN PATENT DOCUMENTS

| | | |
|---|---|---|
| JP | 2012-173819 A | 9/2012 |
| JP | 2015-88085 A | 5/2015 |

*Primary Examiner* — Chia Wei A Chen
(74) *Attorney, Agent, or Firm* — Canon U.S.A., Inc. IP Division

(57) ABSTRACT

A display control apparatus includes, a reception unit that receives an operation on a display object displayed in a display area, a changing unit that changes the display area to a second size smaller than a first size, and a control unit that controls to, in a case where the operation is not received while the display area is displayed in the first size, when the display area is changed from the first size to the second size, display a first range of the display object, and in a case where the operation is received while the display area is displayed in the first size, when the display area is changed from the first size to the second size, move the display object to display a second range.

19 Claims, 11 Drawing Sheets

(56) References Cited

U.S. PATENT DOCUMENTS

| | | | |
|---|---|---|---|
| 2014/0181736 A1* | 6/2014 | Dong | G06F 3/0481 715/799 |
| 2014/0223367 A1* | 8/2014 | Hatada | G06F 3/04842 715/810 |
| 2014/0362119 A1* | 12/2014 | Freund | G06F 3/017 345/661 |
| 2015/0046825 A1* | 2/2015 | Li | G06F 3/0481 715/728 |
| 2015/0212610 A1* | 7/2015 | Tian | G06F 3/041 345/173 |
| 2015/0227297 A1* | 8/2015 | Kim | G06F 3/04845 715/799 |
| 2016/0110016 A1* | 4/2016 | Suzuki | G06F 3/0488 345/619 |
| 2016/0154536 A1* | 6/2016 | Kim | G06F 3/0488 715/768 |
| 2017/0068375 A1* | 3/2017 | Plumb | G06F 3/0416 |
| 2017/0139556 A1* | 5/2017 | Josephson | G06F 3/0482 |
| 2017/0269822 A1* | 9/2017 | Mu | G06F 3/0482 |

\* cited by examiner

ENLARGEMENT

ENLARGED POSITION MOVEMENT

FOCUS AREA EXPANSION

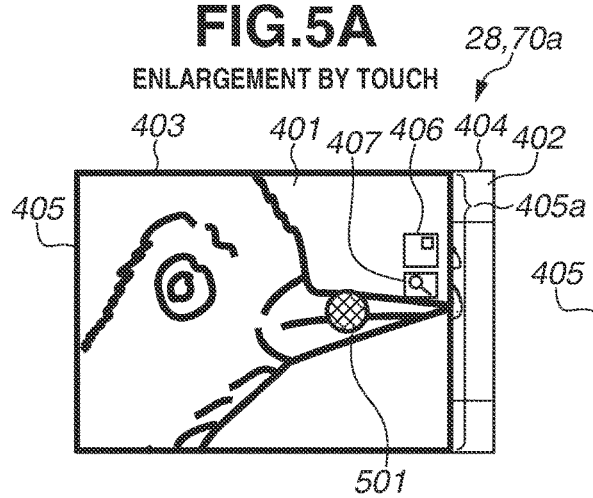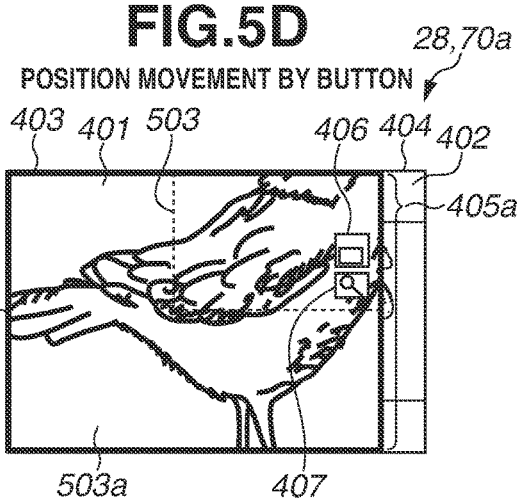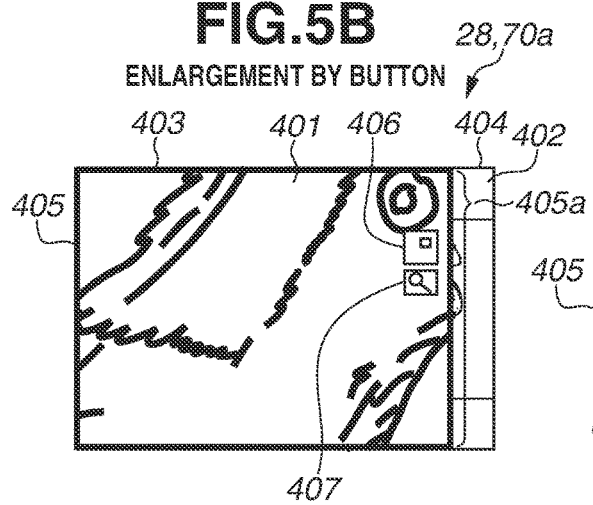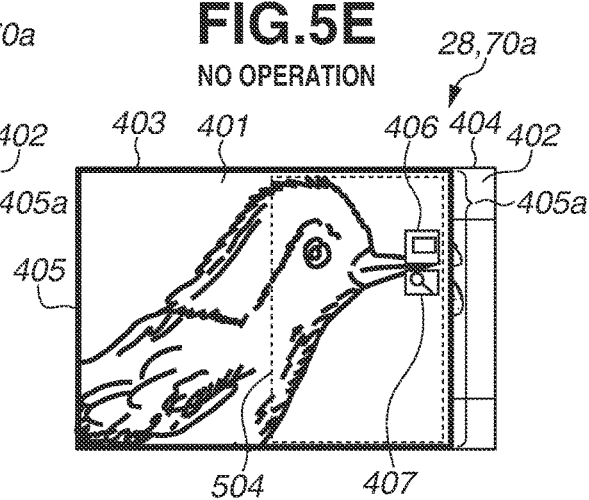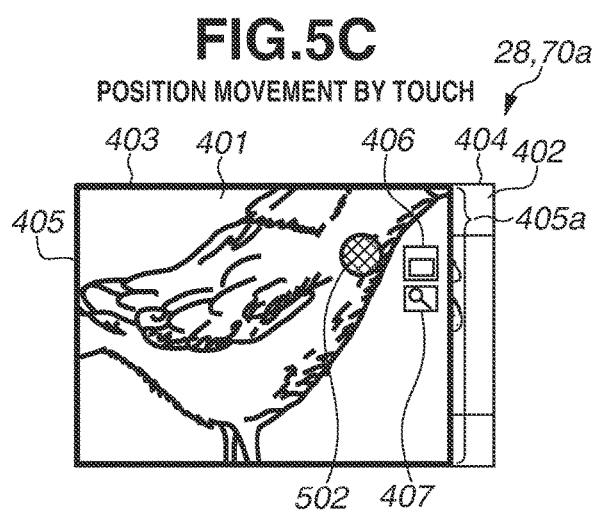

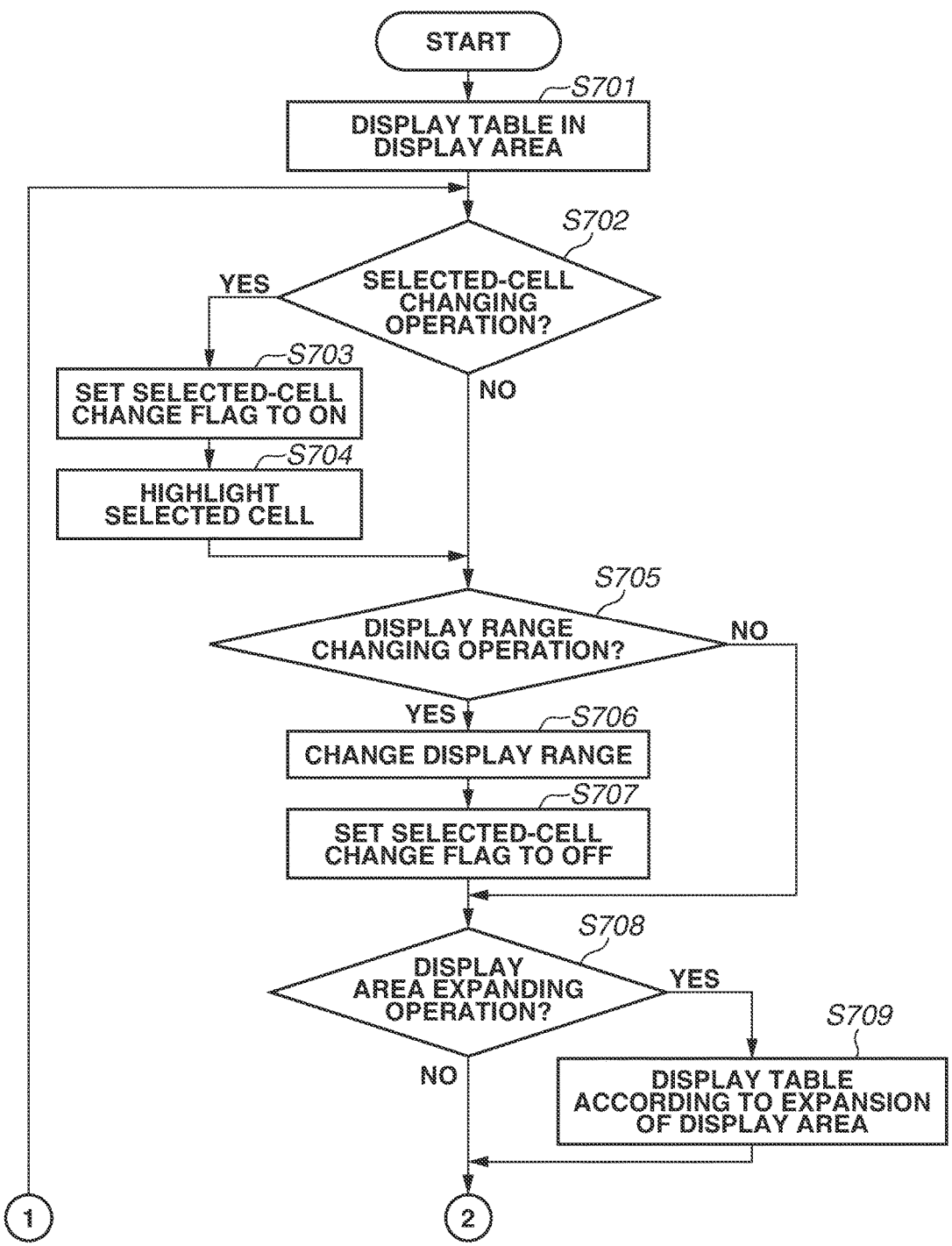

DISPLAY CONTROL APPARATUS AND METHOD FOR CONTROLLING THE SAME

BACKGROUND

Field

The present disclosure relates to a display control apparatus and a method for controlling the display control apparatus and, more specifically, to a technique for performing display in a display area with a variable size.

Description of the Related Art

A user can perform an operation related to image display and confirm an image while displaying an area desired by the user in an image display area. Japanese Patent Application Laid-Open No. 2015-88085 discusses a technique for changing the display ratio of two different images adjacently displayed, through a sliding operation for moving a boundary line between the images, and changing the display magnification of the images according to the movement of the boundary line so that the entire image is displayed. Japanese Patent Application Laid-Open No. 2012-173819 discusses a technique for changing the display position and display magnification of images in a display area in which the images are displayed, and for leaving the display positions of the images unchanged even if the size of the display area is changed.

In the technique discussed in Japanese Patent Application Laid-Open No. 2015-88085, since the display magnification decreases with decreasing display ratio, the images cannot be displayed with the magnification desired by the user. In the technique discussed in Japanese Patent Application Laid-Open No. 2012-173819, a user can search for a desired area by performing a display magnification changing operation and a display position changing operation in a state where the display area is enlarged to facilitate operations. However, in the technique discussed in Japanese Patent Application Laid-Open No. 2012-173819, since the display positions of the images remain unchanged when the size of the display area is changed, the desired area can become invisible if the display area is reduced.

SUMMARY

Embodiments are directed to improving the possibility that, when changing the size of a display area, an area desired by a user is displayed in the display area.

According to an aspect of the embodiments, a display control apparatus includes a reception unit configured to receive an operation on a display object displayed in a display area on a display unit, a changing unit configured to change the display area from a first size to a second size smaller than the first size, and a control unit configured to control the display unit. In a case where the operation is not received while the display area is displayed in the first size, when the display area is changed from the first size to the second size, the control unit controls the display unit to display a first range out of the display object in the display area with the second size. In a case where the operation is received while the display area is displayed in the first size, when the display area is changed from the first size to the second size, the control unit controls the display unit to move the display object to display a second range, which is different from the first range out of the display object and based on a position where the operation has been received, in the display area with the second size.

Further features will become apparent from the following description of exemplary embodiments with reference to the attached drawings.

BRIEF DESCRIPTION OF THE DRAWINGS

FIGS. 5A, 5B, 5C, 5D, and 5E illustrate examples of two-image display while a selected area is expanded.

FIGS. 7A and 7B are flowcharts illustrating table display processing according to a modification of the present exemplary embodiment.

DESCRIPTION OF THE EMBODIMENTS

Exemplary embodiments will be described in detail below with reference to the accompanying drawings. It is to be noted that the following exemplary embodiment is merely one example and can be appropriately modified or changed depending on individual constructions and various conditions of apparatuses. Thus, the following exemplary embodiment is not seen to be limiting.

Figure 1:
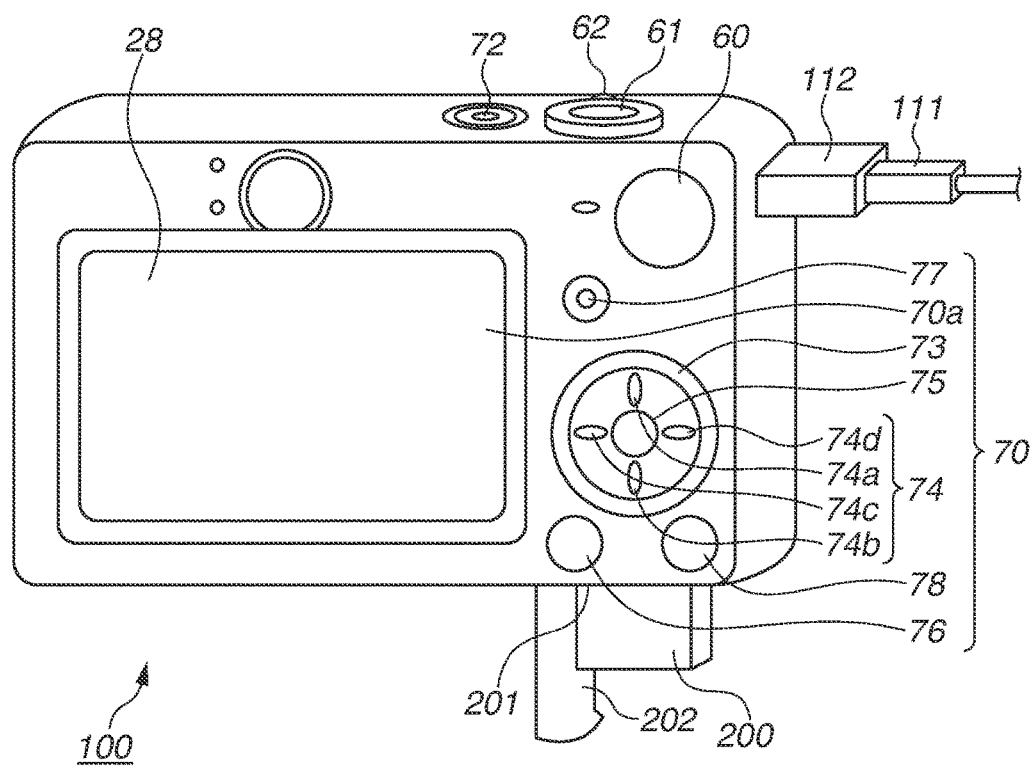
FIG. 1 illustrates an outer appearance of a digital camera as an example of an apparatus to which a configuration of the present exemplary embodiment is applicable.

FIG. 1 illustrates an outer appearance of a digital camera 100 as an example of a display control apparatus according to the present exemplary embodiment.

A display unit 28 displays an image and various information. A touch panel 70a that receives a touch operation is superposed on the display unit 28. A shutter button 61 is an operation unit for issuing an imaging instruction, where, when pressed, the shutter button 61 receives an imaging instruction in the first step and then performs image capturing in the second step. A magnification change bar 62 is provided on the outer circumference of the shutter button 61. Rotating the protrusion of the magnification change bar 62 right or left enables changing the display magnification of the reproduced image displayed on the display unit 28 or the magnification of the image to be captured (zoom in and zoom out).

A mode selection switch 60 is an operation unit for selecting various modes. A connector 112 is used, for example, to connect a connecting cable 111 to the digital camera 100 for connecting the digital camera 100 with a personal computer (PC) or a printer.

An operation unit 70 includes operation members for receiving various user operations, such as various switches and buttons and a touch panel 70a. A controller ring 73 is a rotatably operable operation member included in the operation unit 70. In an image playback mode, an image to be displayed can be selected by rotating the controller ring 73. The controller ring 73 can be any operation member as long as a rotary operation is detectable, such as a dial control member or an operation member for detecting a rotary operation of a user's finger by using a touch sensor, i.e., a touch wheel. The playback button 76 is used to select the image playback mode for reproducing and displaying an image recorded on a recording medium 200 on the display unit 28. The image playback mode can also be selected using the mode selection switch 60. A menu button 77 is used to display a menu screen. A display image count selection button 78 is used to select whether two images are to be displayed on the display unit 28 (two-image display) or one image is to be displayed (single image playback) in the image playback mode. A four-way operational key 74 includes four buttons 74a, 74b, 74c, and 74d corresponding to the four directions (up, down, left, and right), respectively. The four-way operational key 74 enables moving the image, selected item, and cursor in the direction corresponding to a pressed key. Pressing the up key 74a, the down key 74b, the left key 74c, and the right key 74d moves the display position of the image and the cursor in the upward, downward, leftward, and rightward directions, respectively. A SET button 75 is provided at the center of the four-way operational key 74. Pressing the SET button 75 issues an instruction for determining a selected item and an instruction for changing the selected area at the time of two-image display.

A power switch 72 is a push button for turning power ON and OFF. The recording medium 200 is a nonvolatile recording medium such as a memory card or a hard disk. A recording medium slot 201 is used to store the recording medium 200. When stored in the recording medium slot 201, the recording medium 200 can communicate with the digital camera 100, enabling the user to record and reproduce an image on/from the recording medium 200. A lid 202 is a cover of the recording medium slot 201. FIG. 1 illustrates a state where the lid 202 is opened and the recording medium 200 is partly ejected from the slot 201.

Figure 2:
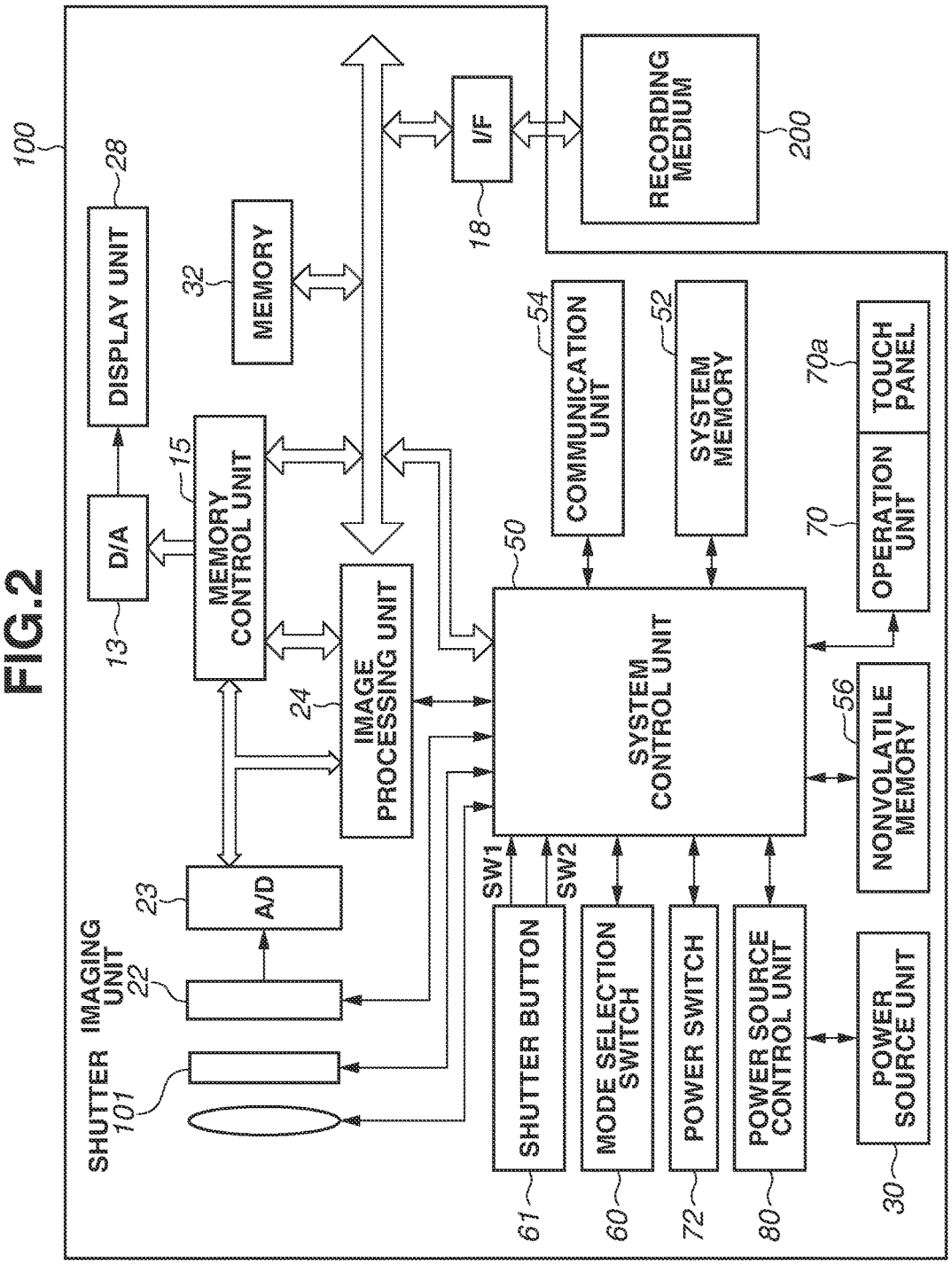
FIG. 2 is a block diagram illustrating an example of a configuration of the digital camera as an example of an apparatus to which the configuration of the present exemplary embodiment is applicable.

FIG. 2 is a block diagram illustrating an example of a configuration of the digital camera 100 according to the present exemplary embodiment.

Referring to FIG. 2, the shutter 101 is provided with an aperture function. An imaging unit 22 is an image sensor including a charge coupled device (CCD) element or a complementary metal-oxide semiconductor (CMOS) element for converting an optical image into an electrical signal. An analog/digital (A/D) converter 23 is used to convert the analog signal output from the imaging unit 22 into a digital signal.

An image processing unit 24 performs resizing processing and color conversion processing, such as predetermined pixel interpolation and reduction, on data from the A/D converter 23 or data from a memory control unit 15. The image processing unit 24 performs predetermined calculation processing by using captured image data. A system control unit 50 performs exposure control and ranging control based on the obtained result of the calculation. Accordingly, autofocus (AF) processing, automatic exposure (AE) processing, and electronic flash preliminary emission (EF) processing are performed on a through-the-lens (TTL) basis. The image processing unit 24 also performs predetermined calculation processing based on the captured image data and, based on the obtained result of the calculation, performs automatic white balance (AWB) processing on a TTL basis.

Output data from the A/D converter 23 is stored in a memory 32 via the image processing unit 24 and the memory control unit 15 or directly stored in the memory 32 via the memory control unit 15 without intervention of the image processing unit 24. The A/D converter 23 converts the signal obtained by the imaging unit 22 into digital data as image data. The memory 32 stores the thus-generated image data and image data to be displayed on the display unit 28. The memory 32 includes a sufficient storage capacity for storing the predetermined number of still images, moving images, and sound for predetermined time periods.

The memory 32 also serves as a memory for image display (video memory). A digital/analog (D/A) converter 13 converts data for image display stored in the memory 32 into an analog signal, and supplies the resultant signal to the display unit 28. In this way, the data for image display stored in the memory 32 is displayed on the display unit 28 via the D/A converter 13. After the digital signal generated through A/D conversion by the A/D converter 23 is stored in the memory 32, the D/A converter 13 converts the digital signal into analog form and successively transfers the analog signal to the display unit 28. This enables the display unit 28 to function as an electronic view finder and display a live view.

A nonvolatile memory 56 serves as a recording medium that is electrically erasable, recordable, and readable by the system control unit 50 including a computer. For example, an electrically erasable programmable read only memory (EEPROM) is used as the nonvolatile memory 56. Constants and a program for operation(s) of the system control unit 50 are stored in the nonvolatile memory 56. The program refers to a computer program for executing various flowcharts (described below) according to the present exemplary embodiment.

The system control unit 50 controls the entire digital camera 100. The system control unit 50 executes the program recorded in the above-described nonvolatile memory 56 to implement each piece of processing according to the present exemplary embodiment (described below). A random access memory (RAM) is used as a system memory 52. Constants, variables, and a program for operation(s) of the system control unit 50 read from the nonvolatile memory 56 are loaded into the system memory 52. The system control unit 50 also performs display control by controlling the memory 32, the D/A converter 13, and the display unit 28.

The mode selection switch 60, the shutter button 61, and the operation unit 70 are operation units for inputting various operation instructions to the system control unit 50. The mode selection switch 60 changes the operation mode of the system control unit 50 to any one of the still image recording mode, the moving image capturing mode, the image playback mode, and the table editing mode. The still image recording mode and the moving image capturing mode can include a plurality of modes.

A power source control unit 80 includes a battery detection circuit, a direct current (DC)-DC converter, a switch circuit for selecting a block to be turned ON, etc., and detects the attachment or detachment of a battery, the battery type, and the remaining battery capacity. The power source control unit 80 also controls the DC-DC converter based on the result of the detection and an instruction of the system control unit 50, and supplies required voltage to each component including the recording medium 200 for a required time period. A power source unit 30 includes a primary battery (such as an alkaline battery and a lithium battery), a rechargeable battery (such as a nickel-cadmium (NiCd) battery, a nickel-metal hydride (NiMH) battery, and a lithium-ion (Li) battery), and an alternate current (AC) adaptor. The power switch 72 is a switch member for turning power ON and OFF.

A recording medium interface (I/F) 18 is an interface to the recording medium 200 such as a memory card and a hard disk. The recording medium 200 is a nonvolatile recording medium for recording images at the time of image capturing, such as a memory card, and can be a semiconductor memory, an optical disc, or a magnetic disk.

A communication unit 54 wirelessly or via wired interface connects with an external apparatus or a network, and transmits and receives video and audio signals. The communication unit 54 can also connect with a wireless local area network (LAN) and the Internet. The communication unit 54 can transmit an image (including a live view) captured by the imaging unit 22 and an image recorded in the recording medium 200, and can receive image data and other various information from an external apparatus.

By selectively operating various function icons displayed on the display unit 28, each operation member of the operation unit 70 is suitably assigned a scene-specific function and serves as a function button. Function buttons include the four-way operational key 74, the SET button 75, the magnification change bar 62, the playback button 76, and the menu button 77. For example, when the menu button 77 is pressed, a menu screen enabling various settings is displayed on the display unit 28. The user can intuitively make various settings by using the menu screen displayed on the display unit 28, the four-way operational key 74 (up, down, left, and right buttons), and the SET button 75. As an operation member of the operation unit 70, the digital camera 100 is provided with a touch detectable touch panel 70a that detects contact on the display unit 28. The touch panel 70a and the display unit 28 can be integrally configured. For example, the touch panel 70a is configured so that the transmissivity of light does not disturb the display of the display unit 28, and is attached to the top layer of the display screen of the display unit 28. The input coordinates on the touch panel 70a are associated with the display coordinates on the display unit 28. This enables configuring a graphical user interface (GUI), which provides the user with the ability to directly operate the screen displayed on the display unit 28.

The system control unit 50 is able to detect the following operations and states on the touch panel 70a:
an operation to start touching the touch panel 70a with the user's finger or a stylus (hereinafter referred to as a "touch-down")
the user's finger or stylus is in contact with the touch panel 70a (hereinafter referred to as a "touch-on")
an operation to move the user's finger or stylus while in contact with the touch panel 70a (hereinafter referred to as a "touch-move")
an operation to remove the user's finger or stylus from the touch panel 70a (hereinafter referred to as a "touch-up")
the user's finger or stylus is not in contact with the touch panel 70a (hereinafter referred to as a "touch-off")
an operation to extend the distance between two touch points while in contact with the touch panel 70a (hereinafter referred to as a "pinch-out")
an operation to reduce the distance between two touch points while in contact with the touch panel 70a (hereinafter referred to as a "pinch-in")

When a "touch-down" is detected, a "touch-on" is also detected at the same time. After a "touch-down", a "touch-on" is typically kept being detected until a "touch-up" is detected. A "touch-move" is detected in a state where a "touch-on" is detected. Even if a "touch-on" is detected, a "touch-move" is not detected if the touch position remains unchanged. After a "touch-up" is detected for all of the touch fingers or stylus, a "touch-off" is assumed.

The above-described operations, states, and position coordinates of touch positions of the user's fingers or stylus on the touch panel 70a are notified to the system control unit 50 via an internal bus. Then, based on the notified information, the system control unit determines what operation has been performed on the touch panel 70a. For a "touch-move", the moving direction of the user's finger or stylus moving on the touch panel 70a can be determined based on a change of the position coordinates for each of the vertical and horizontal components on the touch panel 70a. When the user performs a "touch-down", a certain amount of a "touch-move", and then a "touch-up" on the touch panel 70a, it is assumed that a stroke has been drawn. An operation to quickly draw a stroke is referred to as a flick. A flick is an operation to quickly move a user's finger or stylus while in keeping in contact with the touch panel 70a over a predetermined distance and subsequently removing the user's finger or stylus from the touch panel 70a. In other words, a flick is an operation to quickly flip the surface of the touch panel 70a with the user's finger or stylus. When a "touch-move" greater than or equal to a predetermined speed and greater than or equal to a predetermined distance is detected and then a "touch-up" is detected, it can be determined that a flick has been performed. When a "touch-move" less than the predetermined speed and greater than or equal to the predetermined distance is detected, it can be determined that a drag has been performed. The touch panel 70a can be any type, such as a resistance film type, a capacitance type, a surface acoustic wave type, an infrared type, an electromagnetic induction type, an image recognition type, or an optical sensor type. One type detects a touch when the touch panel 70a is touched, and another type detects a touch even if the user's finger or stylus is only approaching the touch panel 70a and does not actually touch the touch panel 70a.

Two-image display according to the present exemplary embodiment will be described below. Two-image display is a method for simultaneously displaying two different images. The display area is divided into two divisional areas, each displaying a reproduced image. While, in two-image display, the display area for one image is reduced, details can be confirmed by magnifying the image and displaying it in an area desired by the user in the display area. However, according to the amount of the reduction in the display area, the touch-operable range for each image is also reduced, and therefore the displayable range decreases if the image is displayed with the same magnification as that in the single image playback mode. According to the present exemplary embodiment, one display area can be temporarily made larger than one of two divisional areas (a half of the display area for each image when displayed in the single image playback mode). This function enables improving the image visibility and increasing the touch-operable range. Thus, user-friendliness will not be impaired in two-image display. An area where an area expanding/reducing operation, an image display magnification changing operation, and an image display position moving operation can be performed is referred to as a selected area. Either one of the two areas can be selected as a selected area.

Figure 3A:
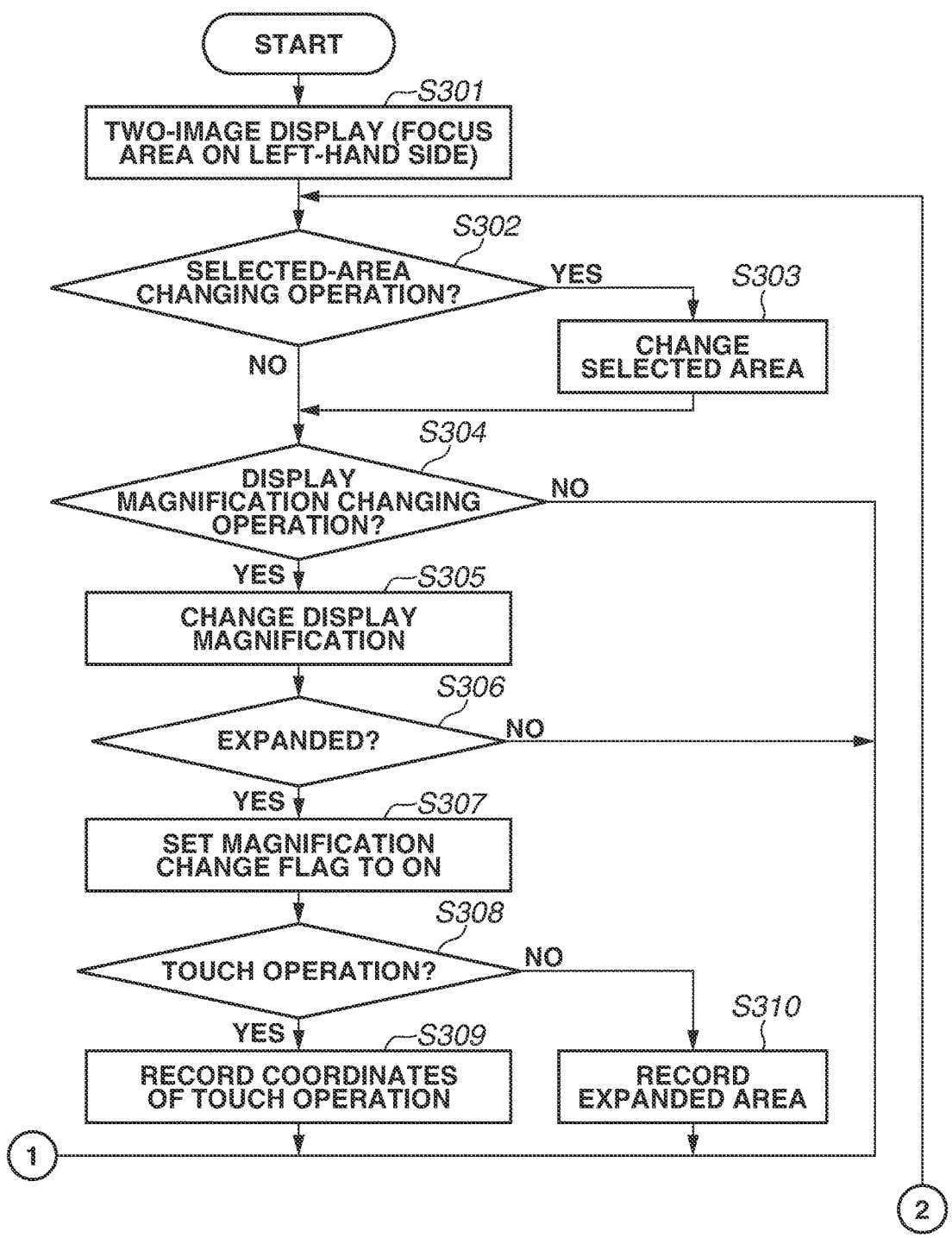
FIGS. 3A, 3B, and 3C are flowcharts illustrating image display processing according to the present exemplary embodiment.
Figure 3B:
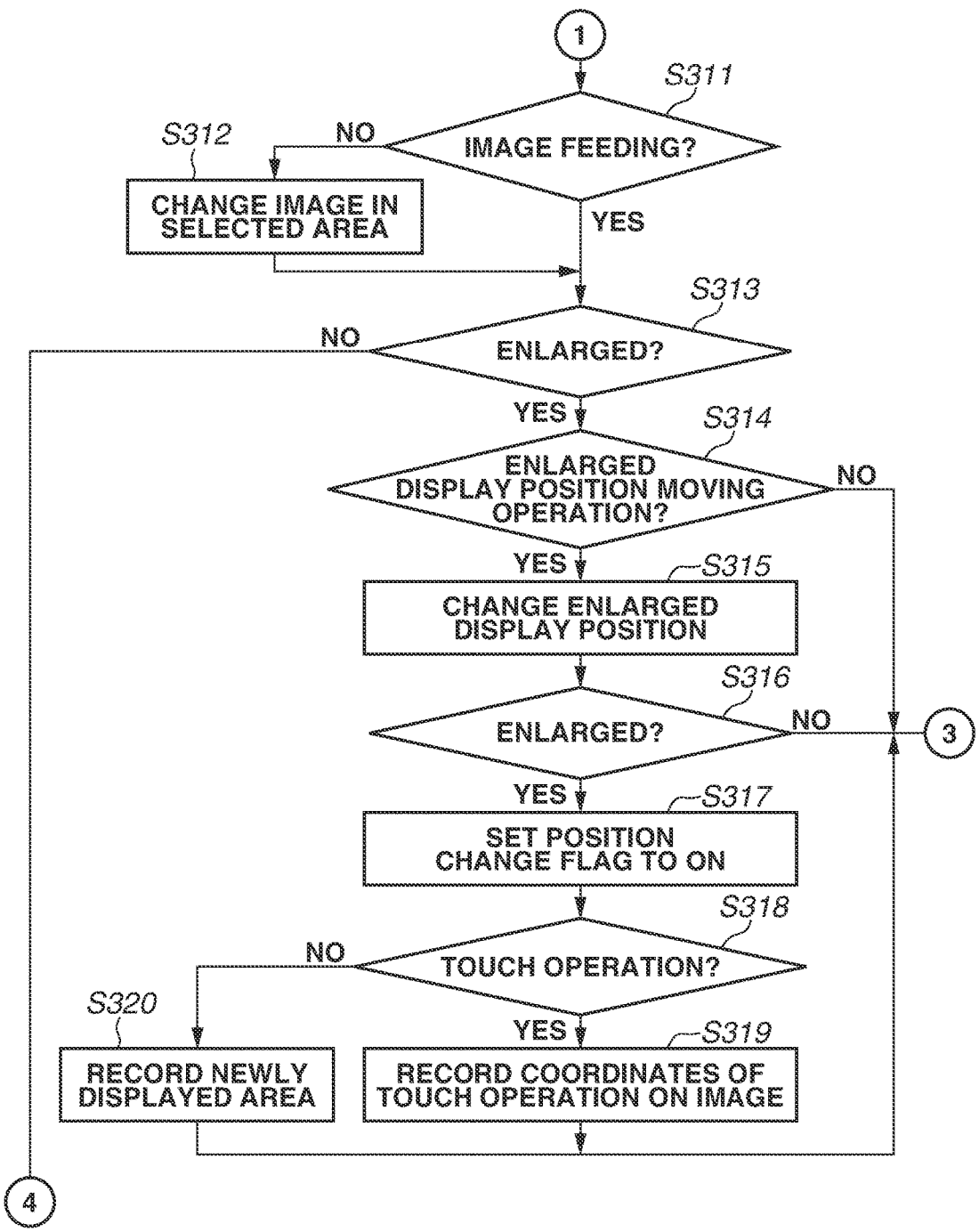
Figure 3C:
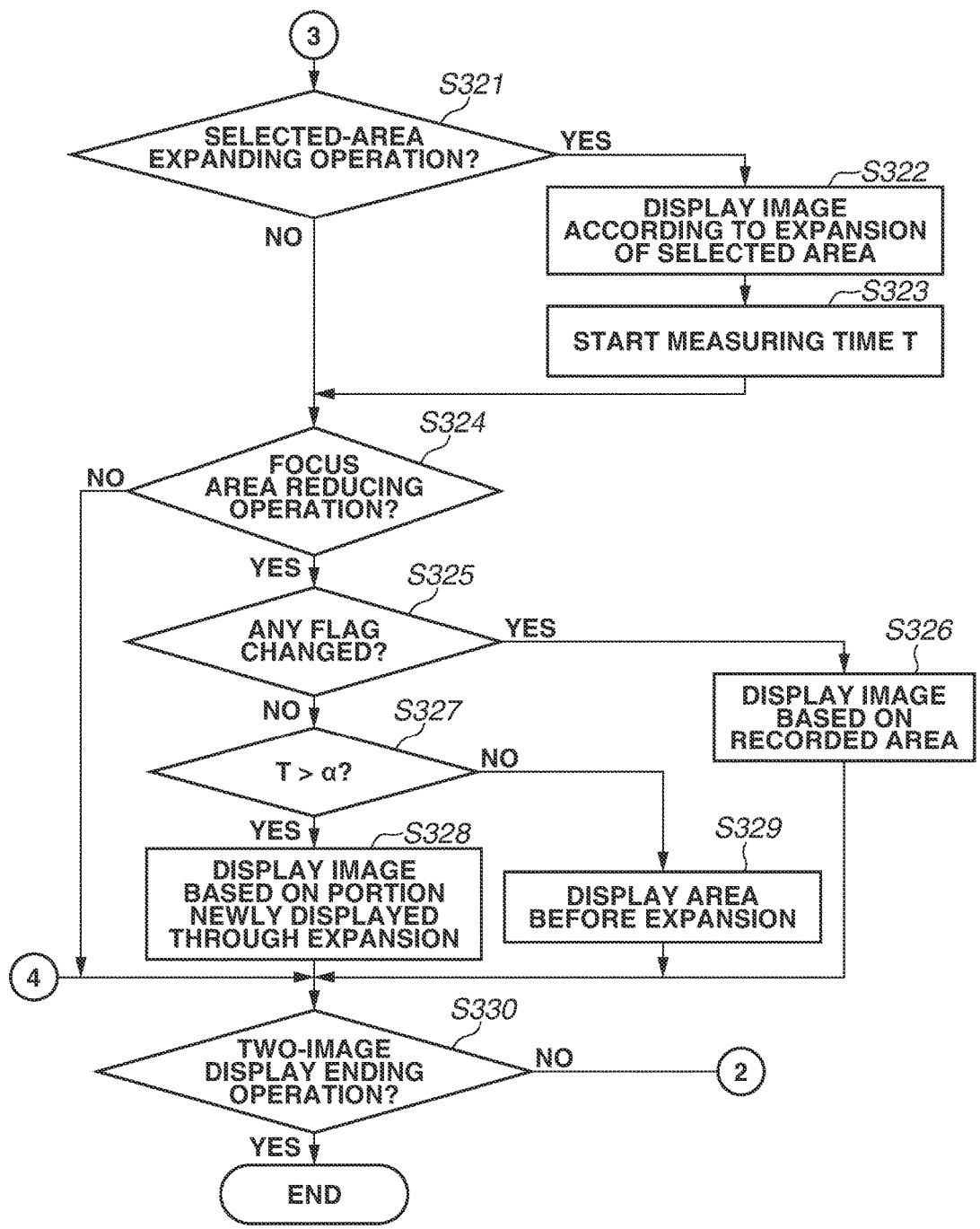

Image display processing according to the present exemplary embodiment will be described below with reference to FIGS. 3A to 3C. This processing is implemented when a program recorded in the nonvolatile memory 56 is loaded into the system memory 52 and then executed by the system control unit 50. This processing is started when power of the digital camera 100 is turned ON, the digital camera 100 enters the image playback mode, and the display image count selection button 78 is pressed.

Figure 4A:
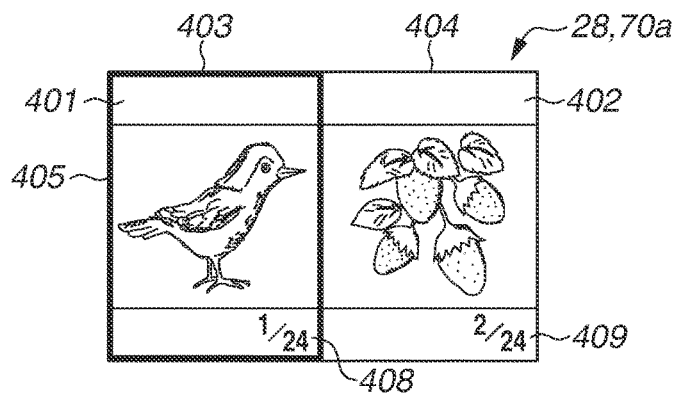
FIGS. 4A, 4B, 4C, and 4D illustrate examples of two-image display.

In step S301, the system control unit 50 displays two different images on the display unit 28, as illustrated in FIG. 4A. FIGS. 4A to 4D illustrate examples of two-image display, the enlargement of an image, the movement of the enlarged position, and the expansion of the selected area, respectively. The display area is divided into two in two-image display, where the left-hand side area is an area 403 and the right-hand side area is an area 404. The area 403 displays the image displayed in the single image playback mode before two-image display is selected. The area 404 displays the image following the image displayed in the area 403. In step S301, the area 403 selected as illustrated in FIG. 4A is enclosed by a thick frame 405. The selected area can receive operations on the area itself and the image displayed therein. Specifically, the user can perform operations for expanding and reducing the area range, changing the image magnification, moving the image display position, and feeding images. An image 401 is displayed in the area 403 and an image 402 is displayed in the area 404, as illustrated in FIG. 4A. According to the present exemplary embodiment, the display magnification of the image displayed in step S301 is x1 in two-image display (reference magnification in two-image display). In the single image playback mode, the reference magnification is different from that in two-image display, i.e., the image is displayed with a larger display magnification. As illustrated in step S301, when the image playback mode is changed from the single image playback mode to two-image display mode, each image is displayed with the reference magnification. However, the image can be displayed in two-image display according to the display magnification used in the single image playback mode, e.g., a half of the display magnification in the single image playback mode.

In step S302, the system control unit 50 determines whether a selected-area changing operation has been performed. A selected-area changing operation can be performed by pressing the SET button 75 or touching the area other than the selected area. When the area 403 is selected as the selected area, touching the area 404 selects the area 404 as the selected area. When the system control unit 50 determines that a selected-area changing operation has been performed (YES in step S302), the processing proceeds to step S303. When the operation has not been performed (NO in step S302), the processing proceeds to step S304.

In step S303, the system control unit 50 changes the selected area. When the selected area is changed from the area 403 to the area 404, the thick frame 405 is displayed to enclose the area 404, enabling the user to perform operations for expanding and reducing the range of the area 404, changing the magnification of the image 402, and moving the display position.

In step S304, the system control unit 50 determines whether a display magnification changing operation (enlarging or reducing operation) has been performed. The display magnification can be changed by performing an operation on the magnification change bar 62 or performing a "pinch-out" or a "pinch-in" on the area 403. When the system control unit 50 determines that a display magnification changing operation has been performed (YES in step S304), the processing proceeds to step S305. When the operation has not been performed (NO in step S304), the processing proceeds to step S311. However, when the selected area is not expanded and the image is displayed with the display magnification as illustrated in FIG. 4A, the image is not reduced even if a reducing operation is performed. In this case, even if a reducing operation is performed in step S304, the result of the determination in step S304 is NO. Similarly, when the length of one side of the selected area is the same as the length of the side of the image corresponding to the one side of the selected area, i.e., the image cannot be reduced any more, the result of the determination in step S304 is NO.

Figure 4B:
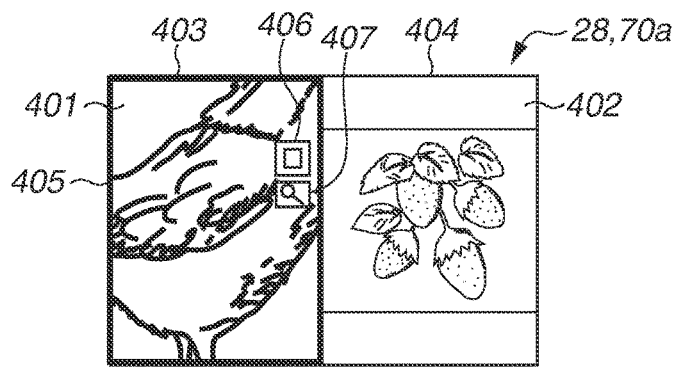

In step S305, the system control unit 50 changes the display magnification of the image displayed in the selected area. FIG. 4B illustrates an example of display when the image 401 is enlarged from the state illustrated in FIG. 4A where the selected area is not expanded. An icon 406 indicates the area currently enlarged in the area 403. An icon 407 indicates that the image 401 displayed in the area 403 is currently enlarged. The black portion of the icon 406 is the entire image 401. The white portion of the icon 406 indicates the size and position of the area currently displayed in the area 403, relative to the entire image 401. An example of display in a state where the selected area is expanded will be described in step S309 or S310 below.

Figure 4C:
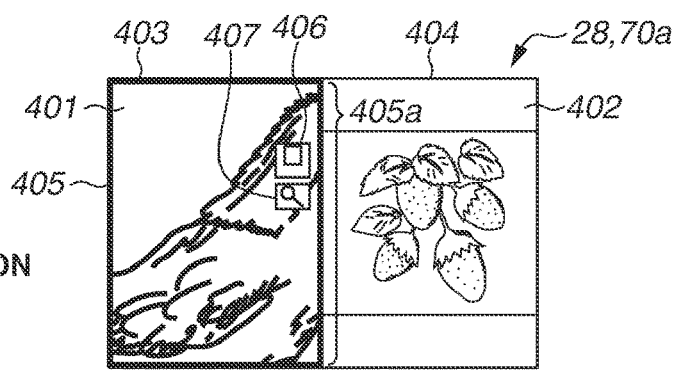
Figure 4D:
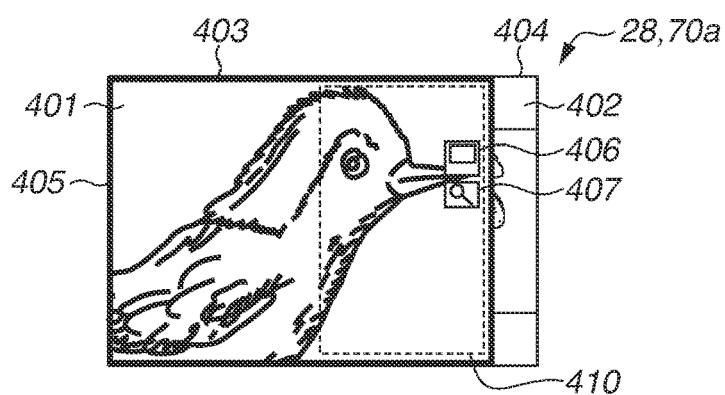

In step S306, the system control unit 50 determines whether the selected area is currently expanded. FIG. 4D illustrates a state of the display unit 28 after the selected area is expanded from the state illustrated in FIG. 4C. The expansion of the selected area will be described in steps S321 to S322 below. When the system control unit 50 determines that the selected area is currently expanded as illustrated in FIG. 4D (YES in step S306), the processing proceeds to step S307. When the selected area is not currently expanded as illustrated in FIGS. 4A to 4C (NO in step S306), the processing proceeds to step S311.

Processing in steps S307 to S310 is performed when an image enlarging operation is performed in a state where the selected area is currently expanded. This processing records which area has been intended to be displayed by the user through an image enlarging operation. Based on the information recorded in steps S307 to S310, the system control unit 50 displays an area desired by the user when the selected area is reduced in steps S324 to S329 (described below).

In step S307, the system control unit 50 sets a magnification change flag that is information stored in the system memory 52 to ON. The magnification change flag indicates the image has been enlarged or reduced in a state where the selected area is currently expanded. More specifically, the magnification change flag indicates that the image has been enlarged to confirm the position portion of the image in more detail or reduced to confirm the image in a wider range.

In step S308, the system control unit 50 determines whether a display magnification changing operation has been performed through a touch operation ("pinch-out" or "pinch-in") in step S304. When the system control unit 50 determines that a display magnification changing operation has been performed through a touch operation (YES in step S308), the processing proceeds to step S309. When the operation has not been performed through a touch operation, i.e., when the operation has been performed through an operation on the magnification change bar 62, (NO in step S308), the processing proceeds to step S310.

In step S309, the system control unit 50 records the coordinates of the reference position for the enlargement and reduction by the touch operation performed in step S304. FIG. 5A illustrates an example of a state where the image 401 is enlarged through a touch operation from the state illustrated in FIG. 4D. A coordinate 501 is an example of a middle point between two touched points in FIG. 5A. The coordinate 501 indicates the coordinate of the middle point (central point) between two points touched at the time of a "pinch-out" or "pinch-in" operation.

In step S309, the system control unit 50 records the coordinates of the reference position of the enlargement or reduction by a touch operation that has changed the display magnification in the system memory 52. FIGS. 5A to 5E illustrate the image 401 in a state where the selected area is currently expanded. FIGS. 5A and 5B illustrate states where the image 401 is enlarged from the state illustrated in FIG. 4D. FIGS. 5C and 5D illustrate states where the display position is moved from the state illustrated in FIG. 4D. Also in steps S310, S319, and S320 (described below), the range of a display area changing operation, i.e., the coordinates and area where the display area changing operation has been performed, is recorded in the system memory 52. Information about the coordinates or area is updated each time a display area changing operation is performed. More specifically, the coordinates or area where the last display area changing operation has been performed is recorded.

In step S310, the system control unit 50 records in the system memory 52 area information indicating the area of the image 401 displayed with the display magnification changed through an operation on the magnification change bar 62 in step S304. FIG. 5B illustrates an example of the image 401 enlarged through an operation on the magnification change bar 62 from the state illustrated in FIG. 4D. In step S310, the system control unit 50 records area information indicating the area illustrated in FIG. 5B in the system memory 52. The area information includes position information of the area out of the entire image 401 illustrated in FIG. 5B, and the coordinates and display magnification of a specific position, for example the center or top left position, of the area illustrated in FIG. 5B.

In step S311, the system control unit 50 determines whether an image changing operation (image feeding) has been performed to select the image to be displayed in the selected area. When the image is enlarged, image feeding can be performed by rotating the controller ring 73. When the image is not enlarged, image feeding can be performed by rotating the controller ring 73 or performing a "touch-move" in the horizontal direction. In image feeding, the image preceding or following the current image (in the recording medium 200) is displayed depending on the rotational direction of the controller ring 73 or the moving direction of a "touch-move". When the system control unit 50 determines that image feeding has been performed (YES in step S311), the processing proceeds to step S313. When image feeding has not been performed (NO in step S311), the processing proceeds to step S312.

In step S312, the system control unit 50 changes the image to be displayed in the selected area. Referring to 4A, according to the present exemplary embodiment, the image 401 is the first image as indicated by a guide 408, and the image 402 is the second image as indicated by a guide 409, from among the 24 image files currently reproduced. Therefore, performing image feeding in the selected area (area 403) displays the following image (second image) or the preceding image (twenty-fourth image).

In step S313, the system control unit 50 determines whether the image displayed in the selected area is currently enlarged compared with the image in step S301. When the system control unit 50 determines that the image is currently enlarged (YES in step S313), the processing proceeds to step S314. When the image is not currently enlarged (NO in step S313), the processing proceeds to step S330.

In step S314, the system control unit 50 determines whether an enlarged display position moving operation has been performed. The enlarged display position can be moved by touching a position in the selected area and moving the touch position ("touch-move") or performing an operation on each key of the four-way operational key 74. When the system control unit 50 determines that an enlarged display position moving operation has been performed (YES in step S314), the processing proceeds to step S315. When the operation has not been performed (NO in step S314), the processing proceeds to step S321.

In step S315, the system control unit 50 changes the area of the image to be displayed in the selected area. FIG. 4C illustrates an example of display when the display area is changed from the state illustrated in FIG. 4B. Referring to FIG. 4C, the area of the image 401 displayed in the area 403 has been moved slightly upward from the area displayed in FIG. 4B. At this timing, the white portion of the icon 406 also moves upward.

In step S316, the system control unit 50 determines whether the selected area is currently expanded. When the system control unit 50 determines that the selected area is currently expanded (YES in step S316), the processing proceeds to step S317. When the selected area is not expanded (NO in step S316), the processing proceeds to step S321.

In step S317, the system control unit 50 sets an enlarged display position change flag that is information stored in the system memory 52 to ON. The enlarged display position change flag indicates that the display area of the image has been changed in a state where the selected area is currently expanded, i.e., the enlarged display position has been moved. More specifically, the position change flag indicates that the user has displayed an area different from the one currently displayed to display a desired subject. For example, when the user specifies the movement of the enlarged display position in a state where the selected area is expanded as illustrated in FIG. 4D, the state as illustrated in FIG. 5C results and then the enlarged display position change flag is set to ON.

In step S318, the system control unit 50 determines whether the enlarged display position moving operation has been performed through a touch operation ("touch-move") in step S314. When the system control unit determines that an enlarged display position moving operation has been performed through a touch operation (YES in step S318), the processing proceeds to step S319. When the operation has not been performed through a touch operation, i.e., when the operation has been performed through an operation on the four-way operational key 74 (NO in step S318), the processing proceeds to step S320.

In step S319, the system control unit 50 records in the system memory 52 the coordinates of the touch operation performed on the image 401 in step S314. Referring to FIG. 5C, coordinates 502 temporarily displayed for description indicate the touch position in the image 401 at the time of a "touch-up" when a "touch-move" has been performed. FIG. 5C illustrates a state where the area of the image 401 displayed in the area 403 has been changed from the state illustrated in FIG. 4D through a "touch-move". More specifically, since a "touch-move" has been upwardly performed, the display area has been downwardly moved in the image 401. The system control unit 50 records in the system memory 52 the coordinates 502 of the touch position where a "touch-move" has been performed. Since the user has touched the coordinates 502 to move the enlarged display position, it is likely that a desired area exists in the vicinity of the coordinates 502.

In step S320, the system control unit 50 records in the system memory 52 the area newly displayed in the selected area through an operation on the four-way operational key 74. FIG. 5D illustrates a state where the area of the image 401 displayed in the area 403 has been changed from the state of the image 401 illustrated in FIG. 4D through a "touch-move". In this case, an area not displayed in FIG. 4D and then newly displayed after the movement of the enlarged display position is recorded in the system memory 52. Referring to FIG. 5D, a dotted line 503 temporarily displayed for description indicates the boundary between the area displayed in FIG. 4D and the area displayed after the movement of the enlarged display position. An area 503a is an area newly displayed after the movement of the enlarged display position. More specifically, in the case illustrated in FIG. 5D, the system control unit 50 records the area 503a.

In step S321, the system control unit 50 determines whether a selected-area expanding operation has been performed. A selected area expanding operation can be performed by touching a boundary line 405a indicating the boundary between the areas 403 and 404, out of the thick frame 405 illustrated in FIG. 4C, and moving the boundary line 405a in a direction for expanding the selected area. FIG. 4D illustrates an example of display after the selected area is expanded from the state illustrated in FIG. 4C. When the area 403 is the selected area, the selected area can be expanded by moving the boundary line 405a to the right. When the system control unit 50 determines that a selected-area expanding operation has been performed (YES in step S321), the processing proceeds to step S322. When the operation has not been performed (NO in step S321), the processing proceeds to step S324.

In step S322, the system control unit 50 displays the range of the selected area in an expanded way as illustrated in FIG. 4D, and records in the system memory 52 the range of the image 401 that had been displayed in the area 403 before the expansion. At this timing, the display position of the image (the image 401 in FIG. 4D) displayed in the selected area remains unchanged. More specifically, after the expansion of the selected area, the area that has not been displayed in FIG. 4C overlapping with the range of the selected area after the expansion (the area enclosed by the dotted line 410 in the image 401) is newly displayed. The display area (white portion) indicated by the icon 406 increases according to the amount of the increase in the area of the image 401 displayed in the area 403. Since the display position of the image 402 displayed in the area 404 does not move, the area 404 is reduced according to the expansion of the area 403.

In step S323, the system control unit 50 starts measuring a time period T. The time period T is used to determine, in step S326, whether the user has expanded the selected area and then immediately, i.e., within a predetermined time period α, has reduced the selected area. The time period T is measured by a system timer (not illustrated).

In step S324, the system control unit 50 determines whether a selected-area reducing operation has been performed. The selected area reducing operation can be performed by touching the boundary line 405a and then moving the boundary line 405a in a direction for narrowing the selected area. In a state where the area 403 that is the selected area is expanded as illustrated in FIGS. 5A to 5E, when the boundary line 405a is moved to the left, the selected area is reduced as illustrated in FIGS. 6A to 6E, respectively. When the system control unit 50 determines that a selected-area reducing operation has been performed (YES in step S324), the processing proceeds to step S325. When the operation has not been performed (NO in step S324), the processing proceeds to step S330.

In step S325, the system control unit 50 determines whether at least either one of the magnification change flag (step S307) or the enlarged display position change flag (step S317) is set to ON or whether neither change flag is set to ON. Each change flag indicates that, after expanding the selected area, the user has performed a specific operation, i.e., a display area changing operation (a magnification changing operation or an enlarged display position changing operation) on the image displayed in the selected area. More specifically, the system control unit 50 determines whether, after expanding the selected area, the user has performed an operation so that the desired subject or area is displayed with a desired magnification or displayed at a desired position. When the system control unit 50 determines that at least either one of the change flags is ON (YES in step S325), the processing proceeds to step S326. When neither change flag is ON (NO in step S325), the processing proceeds to step S327.

In step S326, the system control unit 50 displays the image in the selected area after the reduction based on the coordinates or the area (the range of the display area changing operation) recently recorded in steps S309, S310, S319, and S320. FIGS. 6A to 6E illustrate the area of the image 401 displayed in the area 403 after the reduction of the selected area. The range of the image to be displayed in the selected area after the reduction of the selected area based on the information stored in steps S309, S310, S319, and S320 will be described below with reference to FIGS. 6A, 6B, 6C, and 6D, respectively. The magnification change flag and the enlarged display position change flag are set to OFF.

Figure 6A:
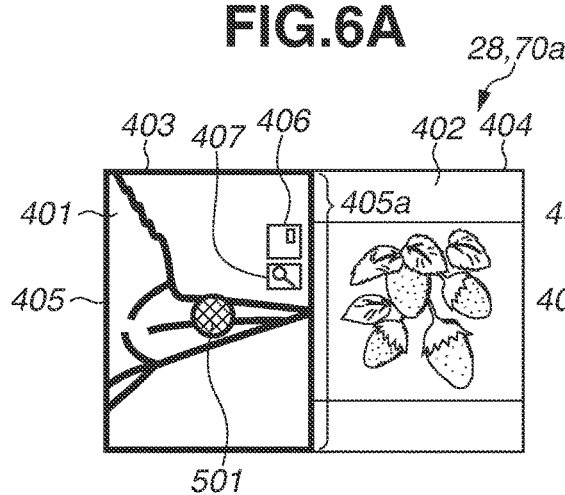
FIGS. 6A, 6B, 6C, 6D, and 6E illustrate examples of two-image display when the selected area is reduced after the expansion.

FIG. 6A illustrates the display area of the image 401 when the selected area is reduced in a state where the image 401 is enlarged through a touch operation as illustrated in FIG. 5A. When the image 401 is enlarged or reduced through a touch operation, the system control unit 50 moves the image 401 according to the reduction of the selected area so that the coordinates recorded in step S309, i.e., the coordinates 501 illustrated in FIG. 5A, become the center of the area 403 after the reduction. The area in the vicinity of the coordinates 501 is an area where the user has expanded the image 401 to confirm details or the user has reduced the image 401 to confirm the periphery. Therefore, the system control unit 50 moves the image 401 so that the area based on the coordinates 501 fits into the area 403 after the reduction of the selected area.

Figure 6D:
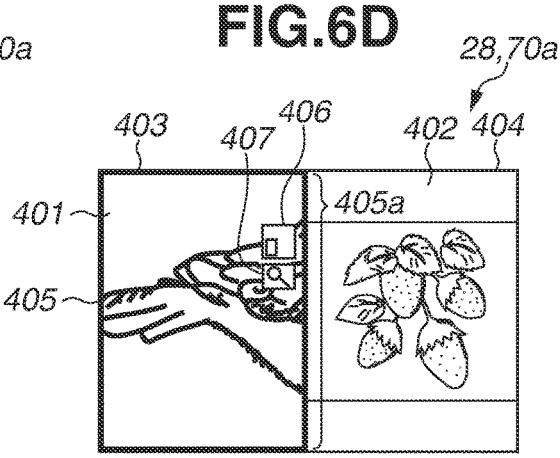
Figure 6B:
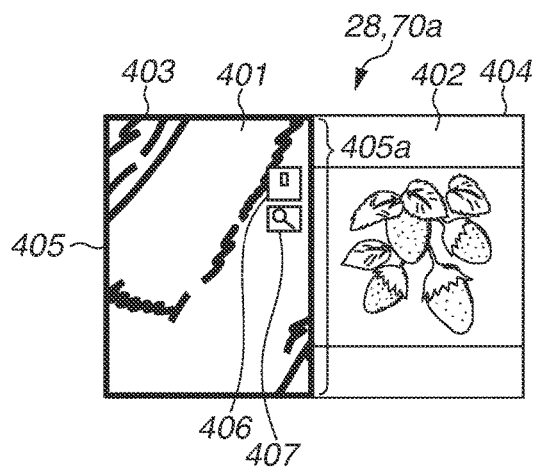

FIG. 6B illustrates the display area of the image 401 when the selected area is reduced in a state where the image 401 is enlarged through an operation on the magnification change bar 62 as illustrated in FIG. 5B. When the image 401 is enlarged or reduced by using the magnification change bar 62, the system control unit 50 displays in the selected area the central area of the areas displayed in FIG. 5B and recorded in step S310. The range of the display area changing operation recorded in the system memory 52 is updated each time the display magnification is changed or the enlarged display position is moved. Therefore, if the operation last performed is a display magnification changing operation, it is likely that the desired subject exists in an area in the vicinity of the center in the area 403. More specifically, it is likely that the user has moved the desired subject to the center of in the area 403 in advance or that the desired subject is already in the vicinity of the center of the area 403 without being moved. Therefore, when the selected area is reduced, the system control unit 50 moves the image 401 so that the central area of the area with the changed magnification is displayed.

Figure 6E:
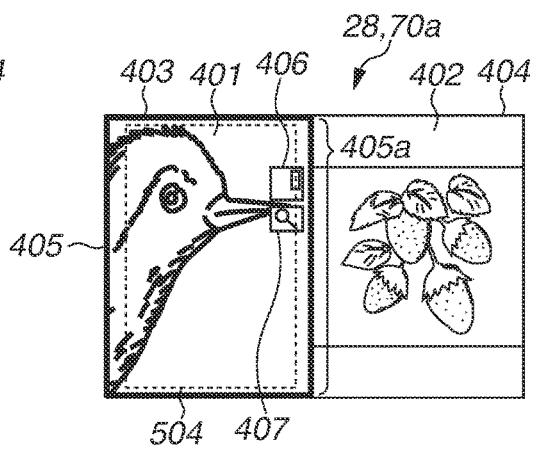
Figure 6C:
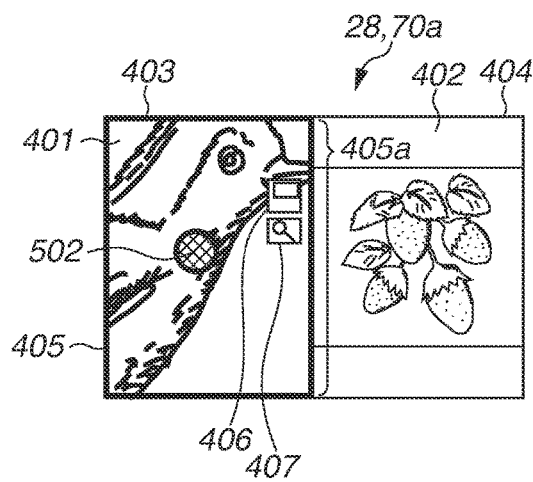
Figure 7B:
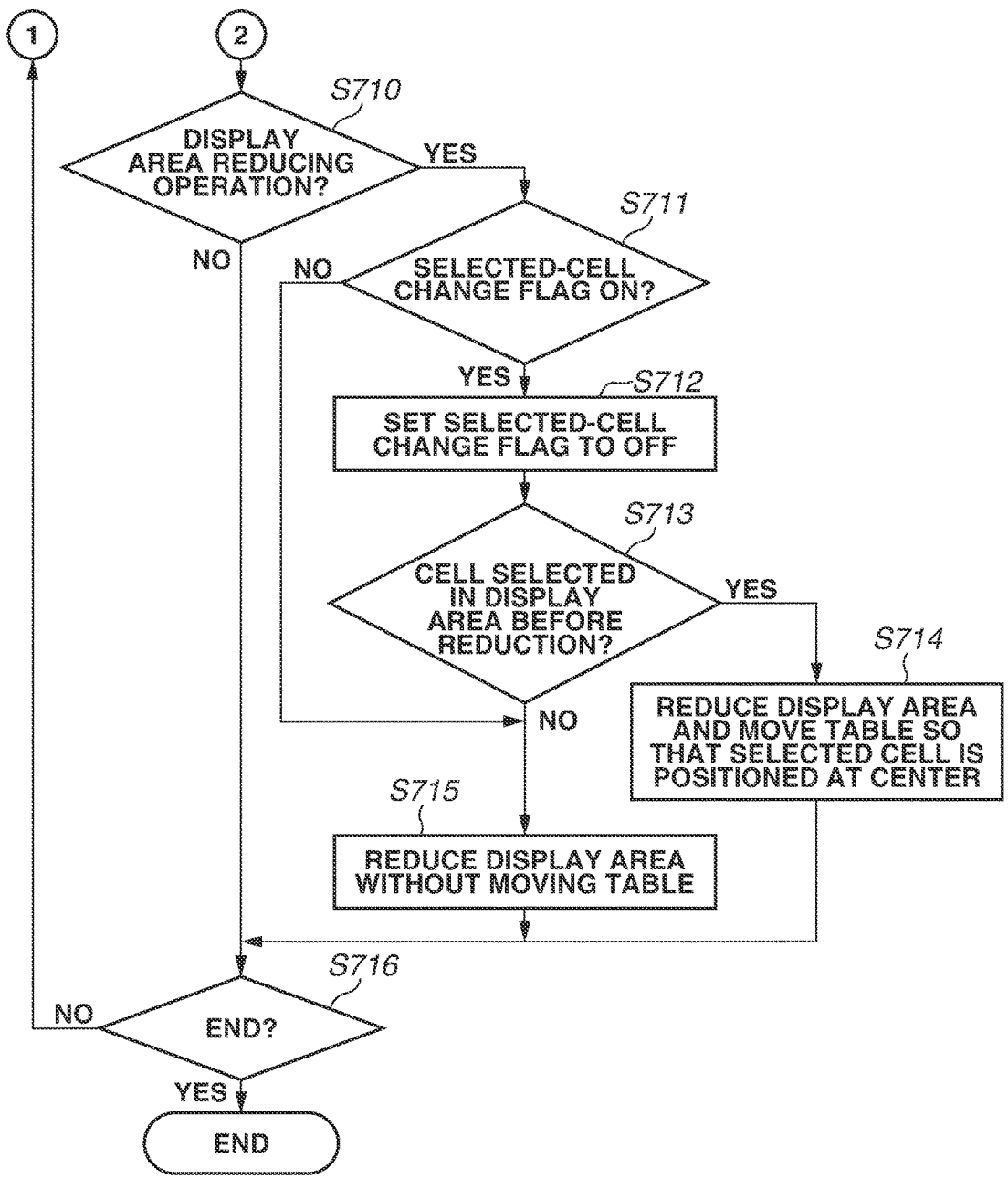

FIG. 6C illustrates the display area of the image 401 when the selected area is reduced in a state where the enlarged display position of the image 401 is moved through a touch-move as illustrated in FIG. 5C. When the display area is changed through a touch-move, the system control unit 50 moves the image 401 based on the reduction of the selected area so that the coordinates recorded in step S319, i.e., the coordinates 502 illustrated in FIG. 5C, become the center of the area 403. The area in the vicinity of the coordinates 502 is an area where the user has touched to display the image 401 in the area 403 or the user has performed a "touch-move" to move the image 401 into the area 403. Therefore, the system control unit 50 moves the image 401 so that the area based on the coordinates 502 fits into the area 403 after the reduction of the selected area.

FIG. 6D illustrates the display area of the image 401 when the selected area is reduced in a state where the enlarged display position of the image 401 is moved by the four-way operational key 74 as illustrated in FIG. 5D. When the display area is changed through an operation on the four-way operational key 74, the system control unit 50 moves the image 401 according to the reduction of the selected area so that the newly displayed area 503a illustrated in FIG. 5D is displayed in the area 403 after the reduction. If the area 503a does not fit into the area 403 after the reduction, the system control unit 50 moves the image 401 so that the center of the area 503a is positioned at the center of the area 403 after the reduction. It is likely that a subject desired by the user exists in the area newly displayed in the area 403 by the user. Therefore, the system control unit 50 moves the image 401 so that the area based on the area 503a fits into the area 403 after the reduction of the selected area.

In step S327, the system control unit 50 determines whether the time period T is greater than the predetermined time period α. The predetermined time period a is a time period such as, for example, one or two seconds, and a time period used to determine whether the user has expanded the selected area and then immediately has reduced the selected area without performing a display area changing operation. If the user has reduced the selected area immediately, i.e., within the predetermined time period α, it is likely that the user performed operations in the following way. More specifically, when the desired subject existed in the selected area before the expansion, the user has displayed the peripheral range for confirmation and then has confirmed the state in the expanded area without changing the display area. If the user has reduced the selected area after a certain time period has elapsed without changing the display area, it is likely that the user has reduced the selected area after confirming that the desired subject has existed in the expanded display area. When the system control unit 50 determines that the time period T is greater than the predetermined time period α (YES in step S327), the processing proceeds to step S328. When the time period T is not greater than the predetermined time period α (NO in step S327), the processing proceeds to step S329.

In step S328, the system control unit 50 moves the image 401 so that the area newly displayed through a selected-area expanding operation is displayed in the area 403 after the reduction. FIG. 6E illustrates an example of display of the image 401 when the selected area has been expanded, neither a magnification changing operation nor an enlarged display position changing operation has been performed for the predetermined time period α, and then the selected area has been reduced. A dotted line 504 illustrated in FIG. 5E indicates an area newly displayed with the expansion of the selected area. In step S328, as illustrated in FIG. 6E, the system control unit 50 moves the image 401 according to the reduction of the selected area so that the area enclosed by the dotted line 504 illustrated in FIG. 5E is displayed.

In step S329, the system control unit 50 displays the area displayed in the area 403 before the expansion of the selected area, through the reduction of the selected area. If the user has expanded the display area and then immediately has reduced the display area, the system control unit 50 narrows the area to be displayed in the area 403 according to the amount of reduction of the selected area without moving the image 401 with the reduction. This enables the user to confirm the desired subject in the area 403 immediately after the reduction of the selected area.

In step S330, the system control unit 50 determines whether a two-image display ending operation has been performed. Two-image display ends when the menu button 77, the display image count selection button 78, or the playback button 76 is pressed, or when power is turned OFF. When the menu button 77 is pressed, the system control unit 50 displays the menu screen related to the image playback mode. When the display image count selection button 78 is pressed, the system control unit 50 selects the single image playback mode. When the playback button 76 is pressed, the system control unit 50 ends the image playback mode and selects the image capturing mode. When the system control unit 50 determines that a two-image display ending operation has been performed (YES in step S330), the image display processing is ended. When the operation has not been performed (NO in step S330), the processing returns to step S302.

According to the above-described exemplary embodiment, when the user reduces the selected area, the user can easily confirm the desired area in the reduced area. When the user changes the magnification or the enlarged display position after expanding the selected area, the system control unit 50 moves the image according to the reduction of the selected area so that the image area according to the user operation is displayed in the selected area after the reduction. Therefore, after reducing the selected area, the user does not need to perform a moving operation to display the desired area in the selected area. When the user wants to enlarge the desired subject and display the subject in the selected area, the selected area after the expansion provides the user with an easier "touch-move" and a wider display range than the selected area after the reduction. Therefore, operability improves if the user can move the desired subject in a state, after the expansion of the selected area, where subject confirmation and moving operation can be easily performed.

It is likely that the user performs a touch operation intending to intuitively touch a subject and move the desired subject. It is also likely that the user performs an operation on an operation member intending to move the display area while monitoring the image area displayed in the selected area. Therefore, depending on whether the user performs a touch operation or an operation on an operation member, the system control unit 50 differentiates the area to be displayed when the selected area is reduced. More specifically, when the user changes the magnification or the enlarged display position through a touch operation, the area to be displayed after the reduction of the selected area is determined based on the touch position. In this case therefore, the area of the image intuitively specified by the user through a touch operation can be displayed after the reduction of the selected area. When the user changes the magnification or the enlarged display position through an operation on an operation member, the area to be displayed after the reduction of the area is determined based on the area displayed or subjected to magnification change according to the operation. In this case therefore, the area desired by the user can also be displayed after the reduction of the area.

When the user changes the display mode from the two-image display mode to the single image playback mode, the system control unit 50 displays an image not based on the display magnification and display position of the image in the selected area. The user expands the selected area intending to temporarily make it easier to confirm the image and perform a display area changing operation. However, when the single image playback mode is selected, it is likely that the user intends to confirm the entire image. In this case therefore, neither the magnification nor the display position succeeds.

While, in the present exemplary embodiment, there are two different areas (areas 403 and 404), the area does not necessarily need to be divided into two, and can be divided into three or more. Alternatively, the size of one area can be changed. For example, the display unit 28 displays the area 403 including a variable size, and the area 403 displays an image and the above-described screen. The background of the area 403 displays a menu screen, a live view screen, a home screen, and so on. The area to be displayed when the area 403 is reduced is determined by the condition of a user operation performed on the screen displayed in the area 403. Even with one screen, if an area according to the condition of a user operation is displayed in this way when the display area is reduced, the user will not overlook the area under confirmation or the area under operation, eliminating the need of searching for a desired area in a narrow area.

Although, in the present exemplary embodiment, an area can be expanded or reduced by moving the boundary line between the areas 403 and 404, the configuration is not limited thereto. Each area can be expanded and reduced by moving the frame thereof. When there is a plurality of areas, the areas do not necessarily need to be adjacent to each other. Another image, such as one with a fixed display area, can be displayed between the areas that can be expanded and reduced.

In the above descriptions, after expanding the selected area, if the user does not change either the display magnification or the enlarged display position and then reduces the selected area after the predetermined time period α or longer has elapsed (YES in step S327), the image is displayed based on a newly displayed area. However, it is not necessary to set the predetermined time period α. More specifically, after expanding the selected area, if the user reduces the selected area without performing any operation on the image, the image can be displayed based on the newly displayed area regardless of the time period as in step S328, or the area that has been displayed can be displayed as in step S329. If the user reduces the selected area before the predetermined time period α has elapsed, the newly displayed area can be displayed according to the reduction of the selected area. When the user reduces the selected area after the predetermined time period α or longer has elapsed, the area that has been displayed can be displayed in the reduced display area.

While, in the above descriptions, the image display position is left unchanged when expanding the selected area, the display position can be changed with the expansion.

[Modification]

Table display processing as a modification of the above-described exemplary embodiment will be described below with reference to FIGS. 7A, 7B, and 8A to 8G. In the above-described exemplary embodiment, an image is displayed in the display area. In a modification to be described below, a table is displayed in the display area. This processing is implemented when a program recorded in the nonvolatile memory 56 is loaded in the system memory 52 and then executed by the system control unit 50. This processing is started when the digital camera 100 is turned ON and then the table editing mode is selected.

Figure 8A:
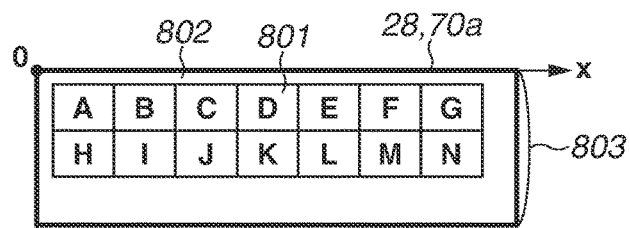
FIGS. 8A, 8B, 8C, 8D, 8E, 8F, and 8G illustrate examples of a display area and a table according to a modification of the present exemplary embodiment.
Figure 8B:
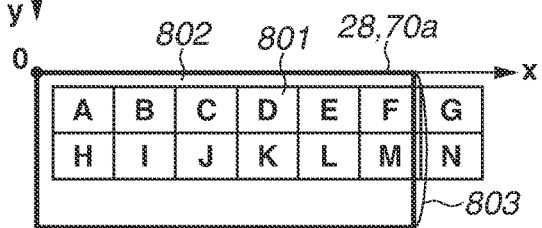

In step S701, the system control unit 50 displays a table in the display area, for example, a table 801 in a display area 802 illustrated in FIG. 8B. FIGS. 8A to 8G illustrate states of the table 801 when the display area 802 is expanded and reduced. FIG. 8B illustrates an example of the table 801 displayed in the display area 802. Referring to FIGS. 8A to 8G, cells outside the display area 802 are illustrated for description purposes, and are not displayed in the display area 802. Referring to FIGS. 8A to 8G, the point at the top left ("0" illustrated in FIG. 8B) is the origin (0, 0). Even when the display area 802 is expanded or reduced, the position of X=0 of the display area 802 does not move.

In step S702, the system control unit 50 determines whether a selected-cell changing operation has been performed. A cell can be selected through a cursor operation, a touch operation on the cell, or an operation on the four-way operational key 74. When the system control unit 50 determines that a selected-cell changing operation has been performed (YES in step S702), the processing proceeds to step S703. When the operation has not been performed (NO in step S702), the processing proceeds to step S705.

In step S703, the system control unit 50 sets a selected-cell change flag recorded in the system memory 52 to ON. The selected-cell change flag indicates whether a cell has been selected by the user in step S702. When the user selects a cell, the user can make an input to the cell. In this case, the cell is enclosed by a thick frame (described below) making it easier to confirm the display content in the cell. Therefore, once the user selects a cell, the user is confirming the selected cell or performing an input operation on the selected cell. Therefore, even if the number of cells displayed in the display area 802 decreases with the reduction of the display area 802, the selected cell needs to be kept being displayed in the display area 802. The selected-cell change flag is provided for this reason. With the selected-cell change flag set to ON, when the display area 802 is reduced, the system control unit 50 moves the table 801 with the reduction so that the selected cell is kept being displayed in the display area 802. With the selected-cell change flag set to OFF, when the display area 802 is reduced, the control system unit 50 does not move the table 801 according to the reduction.

Figure 8C:
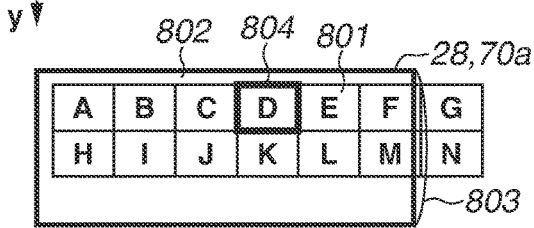
Figure 8D:
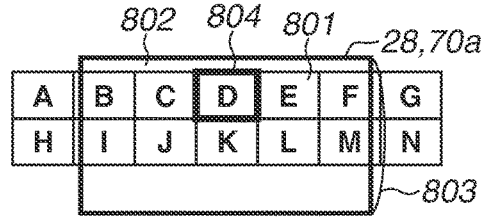
Figure 8E:
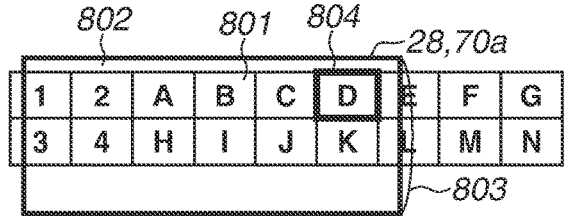
Figure 8F:
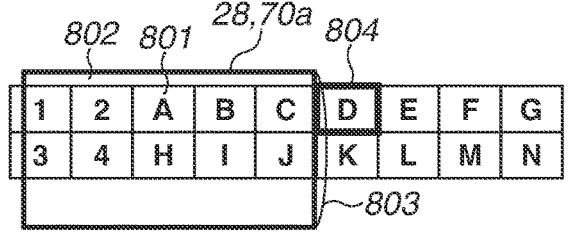
Figure 8G:
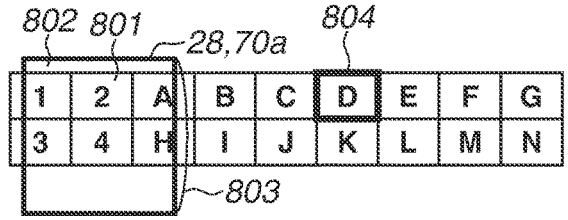

In step S704, the system control unit 50 highlights the selected cell. FIG. 8C illustrates a state where the cell D is selected and the selected cell D is highlighted by a thick frame 804. When the selected cell is changed by using the four-way operational key 74, a cell not displayed in the display area 802 (a part of the table 801 outside the display area 802) can also be selected as illustrated in FIGS. 8F and 8G. Alternatively, when a cell outside the display area 802 is selected, the system control unit 50 can move the table 801 so that the selected cell is displayed in the display area 802.

In step S705, the system control unit 50 determines whether a display range changing operation has been performed. Changing a display range refers to changing cells to be displayed in the display area 802. The display range can be changed by performing a "touch-move" in the display area 802, rotating the touch wheel, or moving the scroll bar. When the system control unit 50 determines that a display range changing operation has been performed (YES in step S705), the processing proceeds to step S706. When the operation has not been performed (NO in step S705), the processing proceeds to step S708.

In step S706, the system control unit 50 changes the display range of the table 801 (cells) to be displayed in the display area 802. FIG. 8E illustrates a state where the table 801 in the display area 802 has been moved from the state where the cell D has been selected as illustrated in FIG. 8C. The size of the display area 802 is the same as the size illustrated in FIG. 8C. Referring to FIG. 8C, cells A to F and H to M has been displayed in the display area 802. Referring to FIG. 8E, the display range is changed, cells 1 to 4 are newly displayed, and a part of the cells E and L and the cells F and M are moved to the outside of the display area 802. More specifically, when a display range changing operation has been performed, it is likely that the user has intended to confirm the cells 1 to 4 or that the user has changed the display range intending to perform an operation, i.e., make an input, but has not intended to confirm or operate the cell E, L, F and M after the display range has been changed.

In step S707, the system control unit 50 sets the selected-cell change flag to OFF. When the selected-cell change flag is not set to ON in step S703, the system control unit 50 does not perform the processing in step S707. When confirming or operating a cell different from the selected cell after the selected cell is changed in step S703, the user changes the display range in step S705. For example, when the user has changed the display range in the display area 802 as illustrated in FIG. 8E from the state illustrated in FIG. 8C, it is likely that the user intends to perform a new operation on the cells 1 to 4. At this timing, if the selected-cell change flag remains ON, the display area moves at the time of reduction to the left so that the cell D does not become invisible and therefore the cells 1 to 4 will protrude from the left end of the display area 802. Therefore, the user who has changed the display range in step S705 intending to operate the cells 1 to 4 needs to again perform an operation for moving the cells 1 to 4 into the display area 802. However, if the selected-cell change flag is set to OFF in step S707, cells do not move as described below and therefore the cells 1 to 4 are kept displayed in the display area 802.

In step S708, the system control unit 50 determines whether a display area expanding operation has been performed. In the modification, the display area can be expanded by moving a display area frame 803 to the right by using the cursor or by performing a touch operation. When the system control unit 50 determines that a display area expanding operation has been performed (YES in step S708), the processing proceeds to step S709. When the operation has not been performed (NO in step S708), the processing proceeds to step S710.

In step S709, the system control unit 50 expands the display area and, with the expansion of the display area, also expands the range of the table 801 displayed in the display area. FIG. 8A illustrates states of the display area 802 and the table 801 where the display area 802 has been expanded from the state illustrated in FIG. 8B. Referring to FIG. 8A, the display area 802 is expanded from the state illustrated in FIG. 8B. Since the range of the table 801 displayed in the display area 802 is also expanded, the cells G and N, which have been invisible in the state illustrated in FIG. 8B, become visible.

In step S710, the system control unit 50 determines whether a display area reducing operation has been performed. In the modification, the display area can be expanded by moving the display area frame 803 to the left by using a cursor or by performing a touch operation. When the system control unit 50 determines that a display area reducing operation has been performed (YES in step S710), the processing proceeds to step S711. When the operation has not been performed (NO in step S710), the processing proceeds to step S716.

In step S711, the system control unit 50 determines whether the selected-cell change flag is ON. When the system control unit 50 determines that the selected-cell change flag is ON (YES in step S711), the processing proceeds to step S712. When the flag is not ON (NO in step S711), the processing proceeds to step S715.

In step S712, the system control unit 50 sets the selected-cell change flag to OFF.

In step S713, the system control unit 50 determines whether there has been a selected cell in the display area 802 before the reduction. FIG. 8C illustrates a case where there is a selected cell in the display area 802. FIG. 8F illustrates a case where there is no selected cell in the display area 802. As illustrated in FIG. 8C, when the cell D is selected in the display area 802, it is likely that the user intends to confirm or operate the cell D. However, when the user has selected the cell D and then has moved the cell D to the outside of the display area 802 or when the user has not moved the cell D into the display area 802, as illustrated in FIG. 8F, it is unlikely that the user intends to confirm or operate the cell D. When the system control unit 50 determines that there has been a selected cell in the display area 802 before the reduction (YES in step S713), the processing proceeds to step S714. When there has been no selected cell (NO in step S713), the processing proceeds to step S715.

In step S714, the system control unit 50 reduces the display area and, at the same time, moves the table 801 so that the selected cell is positioned at the center of the display area after the reduction. FIG. 8D illustrates the states of the display area 802 and the table 801 when the display area 802 is reduced in the state illustrated in FIG. 8C. Since the cell D has been selected before the reduction illustrated in FIG. 8C, the cell D is positioned at the center of the display area 802 illustrated in FIG. 8D after the reduction. Referring to FIG. 8D, since the display area frame 803 has been moved to the left and positioned at the center of the display area 802 after the reduction, the cell D has been also moved to the left. Therefore, the cells A, B, H, and I entirely or partly become invisible in the display area 802. If the table 801 does not move to the left, the cell D becomes invisible in the display area 802. However, since the selected cell moves so as to be displayed in the display area 802 according to the reduction of the display area 802, it is difficult for the user to overlook the selected cell.

In step S715, the system control unit 50 reduces the display area 802 without moving in the table 801. The following describes a case where the system control unit 50 determines that the selected-cell change flag is OFF (NO in step S711) and the processing proceeds to step S715. FIG. 8F illustrates the states of the display area 802 and the table 801 when the display area 802 is reduced from the state illustrated in FIG. 8E where a display range changing operation has been performed in step S705 after the selection of the cell D. The selected cell D, a part of the cells E and L, and the cell K displayed before the reduction as illustrated in FIG. 8E become invisible after the reduction. In this way, when the selected-cell change flag is OFF, even if the user performs a display range changing operation in a state where the selected cell exists in the display area 802, the table 801 does not move according to the reduction. The following describes a case where the system control unit 50 determines that there has been no selected cell in the display area 802 (NO in step S713) and the processing proceeds to step S715. FIG. 8G illustrates an example of display when the display area 802 is reduced from the state illustrated in FIG. 8F where the selected cell D is outside the display area 802. Since the user does not display the selected cell D in the display area 802, it is likely that the user is confirming a cell other than the cell D. In this case, if the selected cell D moves so as to be displayed in the display area 802, the cell currently being confirmed by the user will become invisible. Therefore, the control system unit 50 does not move the table 801. In this way, when the determination result in step S711 or S713 is "NO", the control system unit 50 does not move the table 801 according to the reduction.

In step S716, the system control unit 50 determines whether a table editing mode ending operation has been performed. A table editing mode ending operation can be performed by turning power OFF, pressing the menu button 77, or selecting other modes. When the system control unit 50 determines that a table editing mode ending operation has been performed (YES in step S716), the system control unit 50 ends the table display processing. When the operation has not been performed (NO in step S716), the processing returns to step S702.

According to the above-described exemplary embodiment, when the user reduces the display area 802, it becomes easier to confirm the selected cell (object) in the reduced area. When the user is selecting a cell, the system control unit 50 moves the table 801 according to the reduction of the display area 802 so that the selected cell is displayed in the display area 802 after the reduction. Therefore, the user does not need to perform an operation for moving the table 801 to display a desired cell in the display area 802 after the reduction of the display area 802. When a cell selected by the user is not displayed in the display area 802 or when a display range changing operation (table moving operation) has been performed, the control system unit 50 does not move the table 801 so that the selected cell D is displayed in the display area 802 after the reduction.

When the user is entering a number or text in a cell or when the user is selecting a cell for calculation processing, e.g., when the user is selecting a cell as a target of addition, the system control unit 50 can determine that the cell is selected. When the cursor is positioned at a cell, the system control unit 50 can determine that the cell is not selected.

While, in the above-described exemplary embodiment and modification, the display object of the display processing is an image or a table, the display object is not limited thereto. The present exemplary embodiment and the modification are also applicable to the following display object and the operation position (area) for the display object. For example, the display object can be an area where the user is performing an editing operation in an image editing screen, an area processed by specific processing, an area specified by the user as a destination or mark position on a map, or an area specified by the user as an area to be subjected to predetermined processing such as AF or AE through a live view in the capturing mode. The present exemplary embodiment and the modification are also applicable to the image editing screen, map display, a live view, text display, a text generation screen, a web page, a calendar, and graph and table generation screens. The present exemplary embodiment and the modification are also applicable to text in an e-mail, a memo, a web page, and a text generation screen.

While, in the present exemplary embodiment and the modification, the system control unit 50 determines whether the user has performed an image operation, such as a display magnification changing operation or an enlarged display position changing operation, after the expansion of the selected area. When a predetermined position is preselected by the user, the system control unit 50 can perform the following processing. More specifically, when a position selected by the user in an image or text is displayed in the selected area after the expansion of the selected area, even if the user does not perform a position selecting operation after the expansion, the system control unit 50 determines the display area after the reduction based on the selected position.

The above-described various control to be performed by the system control unit 50 can be performed by a single hardware component, and the entire apparatus can be controlled by a plurality of hardware components which share processing.

The above-described exemplary embodiment is not seen to be limiting, and can be modified in diverse ways without departing from the spirit and scope thereof. The above-described exemplary embodiment is to be considered as illustrative and not restrictive. Exemplary embodiments can be suitably combined.

While the exemplary embodiment and the modification have been described above with reference to the digital camera 100, the exemplary embodiment and the modification are not limited thereto. The exemplary embodiment and the modification can be applied to a display control apparatus that changes the display position of a display object. More specifically, a mobile phone terminal, a portable image viewer, a tablet terminal, a personal computer (PC), a digital photo frame, a music player, a game machine, an electronic book reader, medical equipment, a printer, and so on are all applicable.

(Other Exemplary Embodiments)

Software (program) for implementing the functions of the above-described exemplary embodiments can be supplied to a system or apparatus via a network or various types of storage media, and a computer/CPU/or micro processing unit (MPU) of the system or apparatus reads and executes the program code.

According to the above-described exemplary embodiment, the possibility that, when changing the size of a display area, an area desired by a user is displayed in the display area can be improved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-058811, filed Mar. 23, 2016, which is hereby incorporated by reference herein in its entirety.

What is claimed is:

1. A display control apparatus comprising:
   at least one memroy storing instruction;
   and at least one processor that when executing the instructions cause the display control apparatus to:
   receive an operation on a display object displayed in a display area on a display;
   change the display area from a first size to a second size smaller than the first size; and
   control the display,
   wherein, in a case where the operation is not received while the display area is displayed in the first size, when the display area is changed from the first size to the second size, display is controlled to display a first range out of the display object in the display area with the second size, and
   wherein, in a case where the operation is received while the display area is displayed in the first size, when the display area is changed from the first size to the second size, display is controlled to move the display object to display a second range, which is different from the first range out of the display object and based on a position where the operation has been received, in the display area with the second size.

2. The display control apparatus according to claim 1, wherein the operation is an operation for selecting a position from inside the display object.

3. The display control apparatus according to claim 2, wherein, in a case where the position specified by the operation is not displayed in the display area displayed in the first size, the display is controlled to display a range different from the second range in the display area with the second size even when the display area is changed from the first size to the second size.

4. The display control apparatus according to claim 2, wherein the at least one processor further causes the display control apparatus to move the position of the display object in the display area, wherein, in a case where the operation is received while the display area is displayed in the first size and then the display object is moved, the display is controlled not to display the second range in the display area with the second size even when the display area is changed from the first size to the second size.

5. The display control apparatus according to claim 1, wherein the display object includes at least any one of a playback image, a map, a text, or a chart.

6. The display control apparatus according to claim 1, wherein the display area is changed from the second size to a third size larger than the second size, and
wherein, in a case where the display area is changed from the second size to the third size, the display is controlled not to move the display object either when the operation has or has not been performed.

7. The display control apparatus according to claim 1, wherein the display area is changed from the second size to the first size, and
wherein, after the display area is changed to the first size while the first range is displayed in the display area with the second size, when the display area is changed from the first size to the second size without receiving the operation, the display is controlled to display the first range out of the display object in the display area with the second size.

8. The display control apparatus according to claim 1, wherein the operation is at least either one of an operation for changing a display magnification of the display object or an operation for changing a display position of the display object in the display area.

9. The display control apparatus according to claim 8, wherein, in a case where the operation is an operation for changing the display position of the display object, the second range includes an area, out of the display object, displayed in the display area with the first size according to the operation.

10. The display control apparatus according to claim 8, wherein, in a case where the specific operation is an operation for changing the display magnification of the display object, the second range includes a central point of the display magnification change, out of the display object, performed while the display area is displayed in the first size.

11. The display control apparatus according to claim 1, wherein, in a case where a plurality of operations is performed, the second range is the display object area based on an operation last performed.

12. The display control apparatus according to claim 1, further comprising a touch detector unit configured to detect a touch operation,
wherein the operation is a touch operation, and
wherein the second range is a range including a position according to the touch operation performed while the display area is displayed in the first size.

13. The display control apparatus according to claim 1, wherein the operation is an operation on an operation member, and
wherein the second range is a range including an area displayed in the display area from a state where the area has not been displayed in the display area, through an operation on the operation member performed while the display area is displayed in the first size.

14. The display control apparatus according to claim 1, wherein the operation is an operation for changing a display position of a display object performed either via an operation member or via a touch operation,
wherein, in a case where the operation is performed via a touch operation, a touch position of an image of the touch operation is included in the second range, and
wherein, in a case where the operation is performed via an operation member, an area displayed in the display area by the operation via the operation member is included in the second range.

15. The display control apparatus according to claim 1,
wherein another display object different from the display object is displayed in another display area different from the display area, and
wherein, even if a size of the display area is changed, the another display object displayed in the another display area does not move with respect to the another display area.

16. The display control apparatus according to claim 1, wherein the at least one processor further causes the display control apparatus to select either the display area or another display area different from the display area, wherein a size of a selected display area is changed.

17. The display control apparatus according to claim 1, wherein a size of the display area is changed based on an operation for moving a touch position starting with a frame indicating the display area.

18. A method for controlling a display control apparatus including a display unit, the method comprising:
receiving an operation on a display object displayed in a display area on the display unit;
changing the display area from a first size to a second size smaller than the first size; and
controlling the display unit,
wherein, in a case where the operation is not received while the display area is displayed in the first size, when the display area is changed from the first size to the second size, the display unit is controlled to display a first range out of the display object in the display area with the second size, and
wherein, in a case where the operation is received while the display area is displayed in the first size, when the display area is changed from the first size to the second size, the display unit is controlled to move the display object to display a second range, which is different from the first range out of the display object and based on a position where the operation has been received, in the display area with the second size.

19. A non-transitory computer-readable storage medium storing computer-executable instructions for executing a method for controlling a display control apparatus including a display unit, the method comprising:
receiving an operation on a display object displayed in a display area on the display unit;
changing the display area from a first size to a second size smaller than the first size; and
controlling the display unit,
wherein, in a case where the operation is not received while the display area is displayed in the first size, when the display area is changed from the first size to the second size, the display unit is controlled to display a first range out of the display object in the display area with the second size, and
wherein, in a case where the operation is received while the display area is displayed in the first size, when the display area is changed from the first size to the second size, the display unit is controlled to move the display object to display a second range, which is different from the first range out of the display object and based on a position where the operation has been received, in the display area with the second size.

\* \* \* \* \*